UNITED STATES PATENT OFFICE.

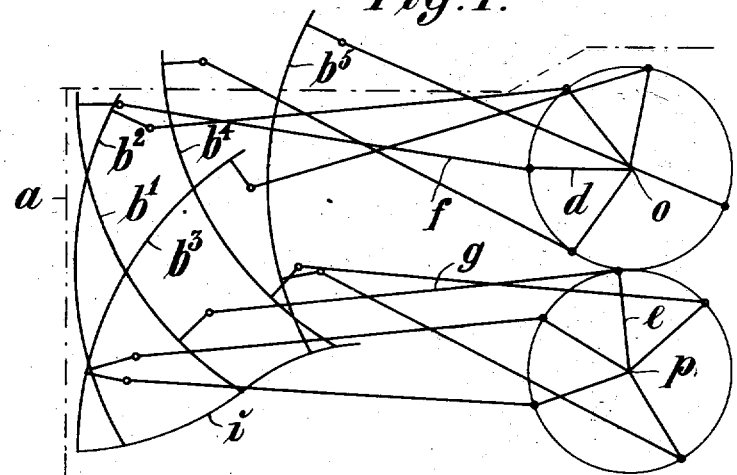
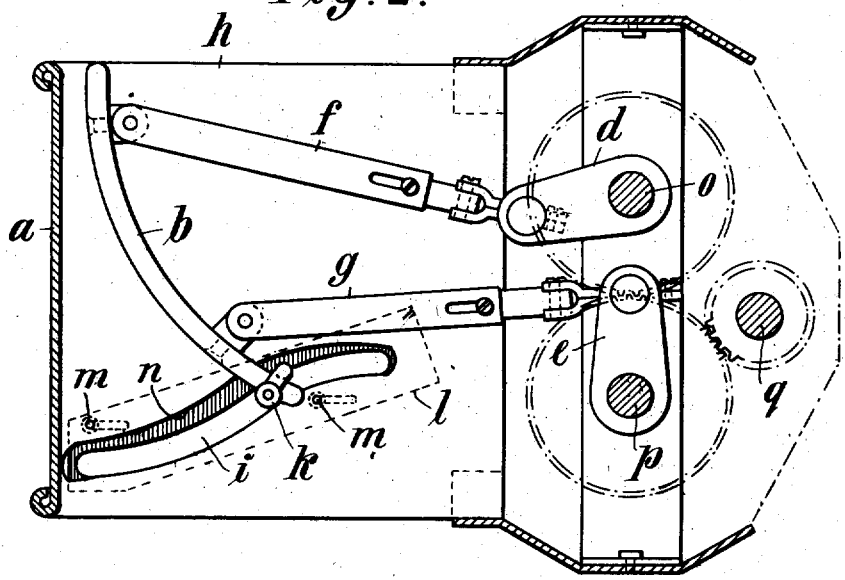

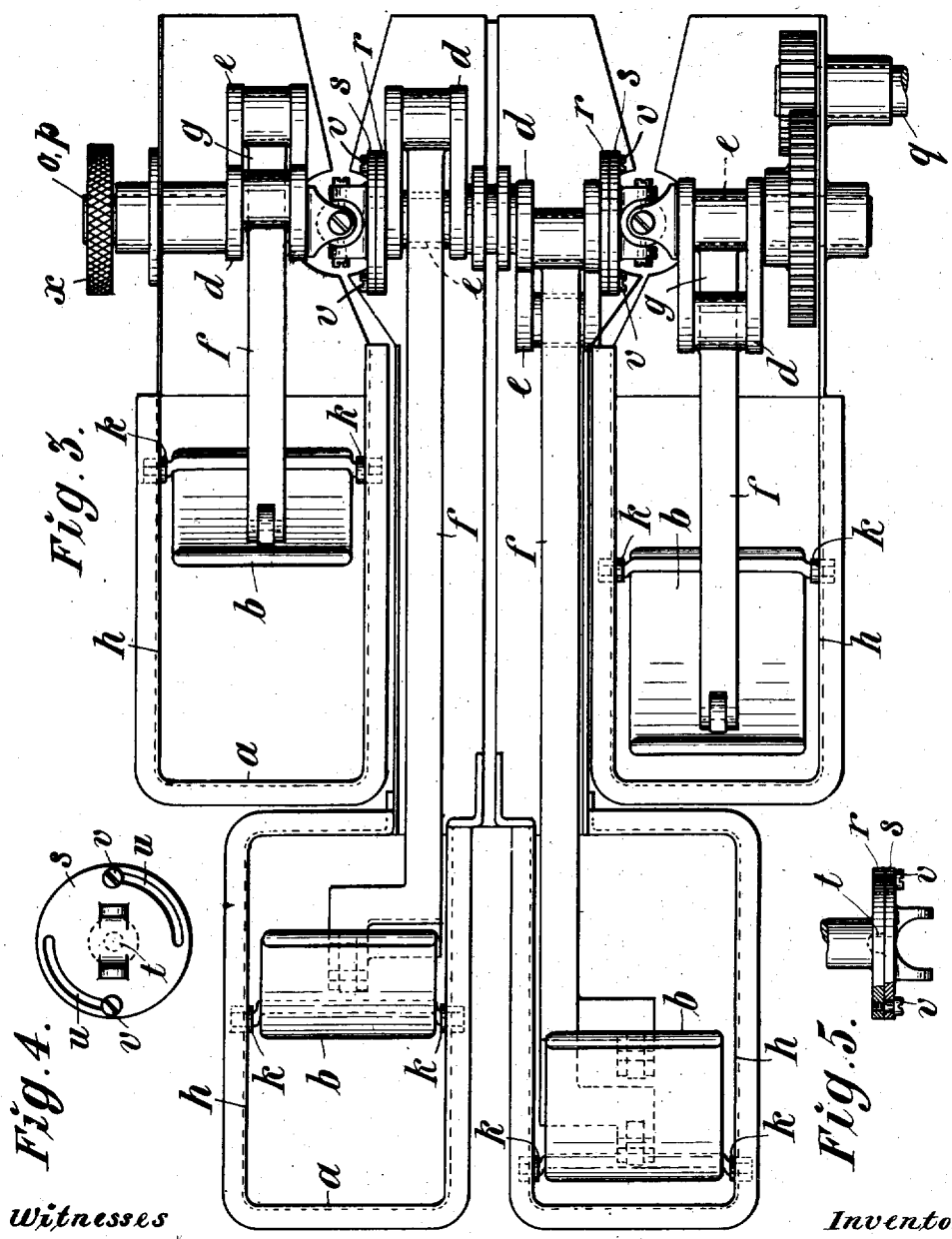

GUSTAF EMIL ANDERSON, OF STOCKHOLM, SWEDEN.

MILKING-MACHINE.

974,011. Specification of Letters Patent. Patented Oct. 25, 1910.

Application filed February 19, 1910. Serial No. 544,778.

*To all whom it may concern:*

Be it known that I, GUSTAF EMIL ANDERSON, a subject of the King of Sweden, residing at Stockholm, in the Kingdom of Sweden, have invented new and useful Improvements in Milking-Machines, of which the following is a specification, reference being had to the drawings accompanying and forming a part hereof.

This invention relates to improvements in milking machines.

The most important condition to be fulfilled in order that machine milking shall have the desired effect is that the clamping members work in a proper manner not only in respect to an effective squeezing out of the milk but also in respect to the teats not being hurt or irritated, for if such is the case the irritated feelings of the cow will not only reduce her power of delivering the milk but will also have the unfavorable influence that the cow is not quiet during milking but will possibly try to free herself from the milking machine.

The object of the invention is to provide a milking machine exerting a soft clamping action which will not in any way irritate the teats and which at the same time will produce an effective and natural squeezing out of the milk.

In the drawings, I have shown a milking machine embodying the invention.

Figure 1 is a diagram illustrating the movement of the arc-shaped clamping member. Fig. 2 is a vertical section of a milking organ and its driving device. Fig. 3 is a top plan view of the whole machine. Figs. 4 and 5 are two views at right angles to each other of a detail.

Referring to the drawings, $a$ is the stationary clamping member, and $b$ is the arc-shaped movable clamping member forming a part of the periphery of a circle and corresponding in length to the length of the stationary clamping member $q$, or the length of a teat. The means for driving the clamping member $b$ may be of any suitable kind. In the embodiment shown it consists of two cranks $d$ and $e$ set at an angle to each other which is nearly equal to a right angle and connected by connecting-rods $f$ and $g$ to the clamping member $b$ at or near the upper and lower edges thereof. The lengths of the cranks and connecting-rods is such as to effect the aforesaid rolling movement without sliding. In order to support the clamping member $b$ and prevent it from sinking, a certain supporting device for the clamping member $b$ is provided, said device consisting in the embodiment shown of slots or grooves $i$ arranged in the sides of the casing $h$. Correspondingly to the rolling movement of the clamping member $b$, the outer, downwardly curved part of each slot or groove $i$ forms the involute, in the present instance the cycloid curve described by a certain point of the clamping member $b$ during its rolling movement, said point being represented by the friction rollers $k$ moving in the slots or grooves $i$. The inner, upwardly curved part of the slot or groove $i$ has such a form that the clamping member $b$, in moving away from the teat, is raised and caused to press against the udder so as to work the same.

In Fig. 1, $b'$, $b^2$ and $b^3$ show the uppermost, an intermediate and the lowermost positions of the movable clamping plate. It appears that the said clamping member will have a perfect rolling movement without sliding. $b^5$ shows one position of the clamping member during its return movement, in which position it is pressed against the udder, and $b^4$ shows a position of the clamping member during its movements toward the teat.

It is, obviously, of importance that the slot or groove $i$ always takes up a proper position, *i. e.* coincides with the cycloid arc hereinbefore mentioned. In order to allow the position of the slot or groove to be adjusted for instance for wear or other reasons, the slot or groove is arranged in a separate plate $l$ adjustable in position on the casing by set screws $m$ and longitudinal slots. In order not to prevent the free movement of the sliding rollers $k$, when the plate $l$ is moved, the casing is provided with spacious slots $n$.

When cranks and connecting-rods are used, the latter may be adjustable in length and compressible longitudinally in order to obtain a soft and yielding movement. For the same purpose the stationary clamping member $a$ may be made springy.

If it be desired that the upper edge of the clamping member $b$ shall be pressed onto the teat earlier than the remaining part of the said clamping member and be kept pressed onto the teat for some time after the other parts of the clamping member have worked the same, the said upper edge may be made to project outward.

In the embodiment shown, motion is transmitted to the crank shafts *o* and *p* by gearing from a flexible shaft *q*. According to Fig. 3, four milking organs are adjustably connected to each other in such a manner as to allow two of the said milking organs to be swung outward or inward for adjusting same to the positions of the teats of the cow. To this end each crank shaft *o* and *p* is provided with two universal joints. The middle portion of each three-part shaft is provided with two cranks, each of the two outer portions having one crank, said cranks being set at angles to each other corresponding to one quarter of a circle. As shown in Fig. 2, the cranks placed in one vertical plane are set at angles to each other which are not quite right angles.

When the milking machine is to be placed on the cow or removed from the same, all the clamping members *a* and *b* must be separated from each other. To this end, the middle portion of each shaft may be provided at its ends with disks *r* bearing with their outer sides on similar disks *s* at the inner ends of the outer portions of the shafts. The disks *r* and *s* are kept in position by pins *t* projecting from the disks *s* into corresponding recesses in the middle portion of the shaft. The disks *s* are provided with concentric slots *u* (Fig. 4) adapted to receive screws *v* screwed into the disks *r*. During working, the screws *v* bear on the ends of the slots *u*, as shown in Fig. 4, whereby the four cranks are caused to take up the relative positions hereinbefore set forth at right angles to each other. By turning the shaft backward by means of the hand-wheel *x* the screws *v* will obviously move in the slots *u* so that the four cranks of the shaft will take up positions allowing all the clamping members *a* and *b* to be separated from each other, by which the machine may be placed in position or removed from the cow.

The movement of the clamping member *b* along the teat may be adjusted so as to continue even after the cranks have moved farther than one quarter of a revolution, by which a following teat will be operated before the pressure on the former has ceased. By this means a uniform running is obtained and the milk is not squeezed out with a violent or unnatural rapidity.

Since the clamping members may be entirely smooth, no rubber need be used as a protecting means for the teat. On account thereof, the machine will be easy to clean. The machine works very silently and especially when cranks and connecting-rods are used, very easily.

The rolling movement of the clamping members relatively to each other is not to be confounded with the rolling action of rolls or the like which are very small as compared with the teats. Such small rolls, which were known long ago, are very disadvantageous on account of the breaking and pulling action which they exert on the teats.

I claim:

1. In a milking machine, the combination of clamping members one of which has a curved form, means for imparting a reciprocating and swinging movement to the said curved clamping member, and a curved path for the said clamping member adapted to support and guide the same during its reciprocating and swinging movement in such a manner as to cause the same to first press on the udder and move along the same in contact therewith and to thereupon roll along the teat so as to compress the same from the root downward, substantially as and for the purpose set forth.

2. In a milking machine, the combination of clamping members one of which has a curved form, means for imparting a reciprocating and swinging movement to the said curved clamping member, and a curved supporting path for the said clamping member having a part of its length in the form of the involute of the curve formed by the clamping surface of the said clamping member, substantially as and for the purpose set forth.

3. In a milking machine, the combination of a substantially straight clamping member, an arc-shaped clamping member coöperating with the former, means for imparting to the said arc-shaped clamping member a reciprocating and swinging movement, and a curved supporting path for the said clamping member having a part of its length in the form of the involute of the curve formed by the clamping surface of the said clamping member, substantially as and for the purpose set forth.

4. In a milking machine, the combination of a substantially straight clamping member, a second clamping member having the form of a circular arc, means for imparting to the said arc-shaped clamping member a reciprocating and swinging movement, and a curved supporting path for the said clamping member having a part of its length in the form of the cycloid of the circular arc of the said clamping member.

5. In a milking machine, the combination of clamping members one of which has a curved form, cranks and connecting-rods connected to the said clamping member for imparting a reciprocating and swinging movement thereto, and a curved path for the said clamping member adapted to support and guide the same during its reciprocating and swinging movement in such a manner as to cause the same to first press on the udder and move along the same in contact therewith, and to thereupon roll along the teat so as to compress the same from the root downward, substantially as and for the purpose set forth.

6. In a milking machine, the combination of clamping members one of which has a curved form, cranks and connecting-rods connected to the said clamping member for imparting a reciprocating and swinging movement thereto, and a curved supporting path for the said clamping member having a part of its length in the form of the involute of the curve formed by the clamping surface of the said clamping member, substantially as and for the purpose set forth.

7. In a milking machine, the combination of a substantially straight clamping member, an arc-shaped clamping member coöperating with the former, cranks and connecting-rods connected to the said latter clamping member for imparting thereto a reciprocating and swinging movement, and a curved supporting path for the said clamping member having a part of its length in the form of the involute of the curve formed by the clamping surface of the said clamping member, substantially as and for the purpose set forth.

8. In a milking machine, the combination of a substantially straight clamping member, a second clamping member having the form of a circular arc, cranks and connecting-rods connected to the said latter clamping member for imparting to the same a reciprocating and swinging movement, and a curved supporting path for the said clamping member having a part of its length in the form of the cycloid of the circular arc thereof.

9. In a milking machine, the combination of curved clamping members corresponding in length to the lengths of the teats, crankshafts for driving the said clamping members, each shaft being divided in three parts pivotally connected to each other, the middle part of each shaft having two cranks and each of the outer parts thereof having one crank, connecting-rods connecting the said cranks to the clamping members for imparting downward rolling movements thereto, and means for guiding the said clamping members during their downward rolling movements in such a manner as to clamp the teats without exerting any pulling action thereon.

10. In a milking machine, the combination of curved clamping members corresponding in length to the length of the teats, crankshafts for driving the said clamping members, each shaft being divided in three separate parts, disks attached to the ends of the middle part of each shaft, disks attached to the inner ends of the outer parts of the shafts and bearing on the said former disks, and means comprising pins and slots for allowing the different parts of the shafts to be turned a certain angle relatively to each other.

GUSTAF EMIL ANDERSON.

Witnesses:
 AUG. SÖRENSEN,
 KARL RUNCSKOG.